United States Patent [19]
Gupta et al.

[11] Patent Number: 6,154,748
[45] Date of Patent: Nov. 28, 2000

[54] METHOD FOR VISUALLY MAPPING DATA BETWEEN DIFFERENT RECORD FORMATS

[75] Inventors: Sundeep K. Gupta, Sunnyvale; Tamarah K. Parker, Morgan Hill; Sarah F. Sherfy, San Jose, all of Calif.

[73] Assignee: International Business Machines Corporation, Armonk, N.Y.

[21] Appl. No.: 09/055,695

[22] Filed: Apr. 7, 1998

[51] Int. Cl.[7] .................................................. G06F 17/30
[52] U.S. Cl. ......................... 707/102; 707/540; 707/523; 707/505; 707/203; 707/102; 705/28; 705/22; 709/253; 345/335
[58] Field of Search ................................... 707/523, 4, 1, 707/101, 505, 540, 203, 22, 28, 102; 395/705; 345/335; 709/253

[56] References Cited

U.S. PATENT DOCUMENTS

| | | |
|---|---|---|
| 4,791,561 | 12/1988 | Huber . |
| 4,930,071 | 5/1990 | Tou et al. ..................................... 707/4 |
| 5,097,408 | 3/1992 | Huber . |
| 5,202,977 | 4/1993 | Pasetes, Jr. et al. ..................... 395/500 |
| 5,257,369 | 10/1993 | Skeen et al. ............................. 709/300 |
| 5,287,537 | 2/1994 | Newmark et al. ......................... 712/29 |
| 5,392,390 | 2/1995 | Crozier ..................................... 345/335 |
| 5,421,001 | 5/1995 | Methe . |
| 5,428,792 | 6/1995 | Conner et al. ............................ 395/708 |
| 5,542,078 | 7/1996 | Martel et al. ............................. 707/101 |
| 5,557,798 | 9/1996 | Skeen et al. ............................... 705/35 |
| 5,649,185 | 7/1997 | Antognini . |
| 5,666,553 | 9/1997 | Crozier ..................................... 707/540 |
| 5,680,618 | 10/1997 | Freund ........................................ 707/7 |
| 5,701,423 | 12/1997 | Crozier ..................................... 345/335 |
| 5,966,531 | 10/1999 | Skeen et al. ............................. 395/683 |

*Primary Examiner*—Hosain T. Alam
*Assistant Examiner*—Jean M. Corrielus
*Attorney, Agent, or Firm*—Sughrue, Mion, Zinn, Macpeak & Seas, PLLC

[57] ABSTRACT

A computer system, computer program product, and method for visually mapping data between different record formats provides for the mapping of source data fields of a dump file to the target data format fields of a digital library using an interactive mapping section output map. The output map includes a grid with cells to indicate crossings between the source data fields and the target data format fields, and the user indicates such crossings without resort to a custom applications loader thus providing dynamic data mapping at execution time.

9 Claims, 11 Drawing Sheets

Fig. 4
PRIOR ART

| Attribute name | Attribute type |
|---|---|
| ID | int(10) |
| First Name | Variable Characters (0..32) |
| Middle Initial | Char(1) |
| Last Name | Variable Characters (0..32) |
| Dept | Char(4) |
| Phone | Char(10) |
| Title | Variable Characters (0..32) |
| Manager | int(10) |
| Location | Char(10) |

| | ID | First Name | Middle Initial | Last Name | Dept | Phone | Title | Manager | Location |
|---|---|---|---|---|---|---|---|---|---|
| 1 | 11111 | John | Q. | Public | DBA | x 235 | clerk | 22222 | San Jose |
| 2 | 33333 | Jane | S. | Doe | ACCO | x 334 | guard | 22222 | DC |
| | | | | | | | | | |

|               | Field 1 | Field 2 | Field 3 | Field 4 | Field 5 |
|---------------|---------|---------|---------|---------|---------|
| ID            | X       |         |         |         |         |
| First Name    |         | X       |         |         |         |
| Middle Initial|         |         |         |         |         |
| Last Name     |         |         | X       |         |         |
| Dept          |         |         |         | X       |         |
| Phone         |         |         |         |         |         |
| Title         |         |         |         |         |         |
| Manager       |         |         |         |         |         |
| Location      |         |         |         |         | X       |

Fig. 11

|   | ID | First Name | Middle Initial | Last Name | Dept | Phone | Title | Manager | Location |
|---|---|---|---|---|---|---|---|---|---|
| 1 | 11111 | John | Q. | Public | DBA | x235 | clerk | 22222 | San Jose |
| 2 | 33333 | Jane | S. | Doe | ACCO | x334 | guard | 22222 | DC |
| 3 | 12345 | Wiley |  | Coyote | Acme |  |  |  | West |
| 4 | 98765 | Bruce |  | Bruno | GPGC |  |  |  | SR72 |

430

METHOD FOR VISUALLY MAPPING DATA BETWEEN DIFFERENT RECORD FORMATS

BACKGROUND OF THE INVENTION

1. Field of the Invention

This invention relates generally to databases. More particularly, this invention relates to a method for loading data into a database.

2. Background and Related Art

Every database management system is based on a general database model. The following are examples of well-known database models: the hierarchical model, the network model, and the relational model. A database management system based on the relational model may be referred to as a relational database management system (RDBMS). An RDBMS is a system of computer programs that facilitates the creation, management, and manipulation of relational databases.

Every relational database is based on the relational model. The relational model is familiar to one of skill in the art. The book "An Introduction to Database Systems", by C. J. Date (Addison Wesley Publishing company) provides an in-depth guide to the relational model, and hereby is incorporated in its entirety by reference. An example of an RDBMS is DB2, which commercially is available through International Business Machines Corporation.

According to the relational model, data is perceived to exist as a collection of relational tables. A relational table expresses a relation between things. Relational tables are characterized by rows and columns. Although the rows and columns of relational tables may be employed in many ways, the relational model provides that columns pertain to entities or attributes of entities, and that rows pertain to specific instances of entities or specific instances of attributes of an entity.

The rows and columns of a relational tables intersect to define data cells. In this discussion, the term record may be used to refer to a row; the terms attribute and field may be used to refer to a column.

Although the structure of the relational model provides for tables, rows, columns, and cells, a certain hierarchy may be observed within the model. That is, a relational database comprises one or more tables; each table comprises one or more rows; each row comprises one or more cells. Thus, the relational model defines four adjacent layers of hierarchy: databases, tables, rows, and cells. The tables layer is the next higher layer of the rows layer. The cells layer is the next lower layer of the rows layer. The tables layer is adjacent the rows layer, but is not adjacent the cells layer. Moreover, a given table may be referred to as an instance of the table layer, a given row as an instance of the row layer, and so on.

Although the relational terminology of tables, rows, columns, and cells is used throughout this description, one of skill in the art will appreciate that the concepts presented herein may be applied outside of the relational model to great advantage. In particular, the concepts are applicable in any database environment in which the data model similarly includes a hierarchy of adjacent layers.

Each column of a relational table has a respective datatype. The datatype of a column restricts the values which the cells of that column may be. For instance, a traditional datatype for a column of a relational table is the integer datatype. If a column has the integer datatype, the cells of that column may have only integer values. Variations on the integer datatype include the small and the large integer datatypes. The small integer datatype is so named because it conventionally is limited in length to half of a word. The large integer datatype, by contrast, may be allocated two words.

Other traditional datatypes include packed decimal, floating point, fixed length character, and variable length character datatypes. As is the case with the integer datatype, variations exist with respect to the other datatypes. Some special purpose variations of the traditional datatypes include logical, money, date, and time.

RDBMS's recently have been improved to provide support also for some nontraditional datatypes. Some supported datatypes include images, video, fingerprints, large objects (LOBs), and audio. In other words, a cell of a relational table may now contain data that is an image, a video segment, a fingerprint, text of great length (such as a book), or an audio segment. Thus, the columns of a relational table now may have nontraditional datatypes as their respective datatypes. Other nontraditional datatypes either presently are or soon will be supported. Examples of other nontraditional datatypes are spreadsheets, lists, and tables, to name but a few.

Applications programs access the data of relational tables by making calls to a database server. Used in this sense, the term "applications programs" may refer to several separate programs, only one program, a module of a program, or even a particular task of a module. An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

Turning now to consider the data, instead of the database, it may be observed that information in many organizations is held in digital form in repositories which are not part of the same data library, the same computing systems or even the same administrative domain. This has hampered access to the information held in those separate repositories, even though the information held separately may be related. For example, an organization may have information residing in completely different data processing systems. These different data processing systems may be in place as a result of combining previous projects, or because of mergers or acquisitions of companies having different data processing systems. It is a common occurrence that valuable data resides and is used in separate and distinct libraries, computing systems or administrative domains.

A problem many such organizations face is that information held in such heterogeneous data stores may, in the minds of people within the organization, be related conceptually. Such data, however, remains unrelated at a data processing level. In other words, the information in one database is not accessible along with the information in another database. Hence, that information can be difficult to handle, and the full value of it unrealized until the unrelated data is joined. Collected into carefully managed records, such information is at the core of what it means to have a library. If the collection is held in digital format, it is known as a digital library.

A digital library as described in U.S. Pat. No. 5,649,185 to Antognini et al., which is incorporated herein by reference. A digital library uses a database, but also allows application programs, residing on a library client, to interact with the underlying digital library services and hence the underlying database, to store and retrieve information.

One way to add information to a digital library is to incorporate the source information from wherever it occurs into this specialized repository. This way of adding information is the primary subject of the invention.

For the sake of clarity, certain terms will now be discussed. The term target digital library means a digital library or a database that a user is using or desires to use. The target digital library requires data to be in one of a plurality of target data formats. The target digital library typically has many target formats, and might have one target format for each table defined within it.

The term unusable data, or source data, refers to data that is stored in a form not directly useable by the target digital library because it is in a form that does not match one of the plurality of target data formats. Source data is typically available from a source database or a source data store (i.e., a magnetic tape, disk, or the like). The unusable data is said to be in a source form, to have a source format, or to have a source data format. To be usable to the target digital library, the source data may be converted from the source data format to one of the plurality of target formats of the target digital library.

In loading data into a target digital library, a preliminary step is usually to create a dump file. A dump file is often produced by an ASCII dump of the source data from the source database. It will be understood that an ASCII dump is a feature commonly available in nearly every database management system, and in nearly every computer system. For example, data preserved on reels of tape may commonly be dumped to a dump file in ASCII. It will be appreciated that ASCII is here used merely as an example, and that EBCDIC or any other manner of representing data may instead be used. It also will be understood that a dump file need not necessarily be a file stored on a disk, but may include a stream of electronic impulses which are generated and provided to a process without any intermediate storage per se of the data.

A dump file can be of many different formats vis-à-vis how the data is logically separated. In one example of a dump file format, records are separated by one or more separator characters. In another example of a dump file format, there is one record per line. In yet another example of a dump file format, there are multiple records per line. Likewise, fields may be distinguished one from another by separator characters, lines, or the like, and may be fixed or variable in length.

In the target digital library, there are a plurality of target data formats. This plurality of target data formats may number in the hundreds. For the sake of clarity, the target data format that the source data must be converted into shall be referred to as a desired target data format. The selection of the desired target data format will depend on how, logically, the source data is to be included in the target digital library. A term which may be used interchangeably with target data format is the term index class. A digital library thus may be said to include a plurality of index classes.

One approach to working with source data in a source data format that is not one of a plurality of target data formats is to write a custom loader application. In other words, to load the data from a dump file, an application programmer writes a custom loader application. Such a custom loader application must understand the format of the dump file, must read the fields from the dump file, and then must assign the right value from the dump file to that of the desired target data format corresponding to the desired data structure. This assignment must be based on knowledge of the record structure of the target digital library.

A problem with the use of custom loader applications is that there are so many different formats possible for the source data, there are typically many input files of source data all in different source data formats, and there are many different target data formats. The problem, more particularly, is that many custom loader applications must be written. The writing of custom loader applications may be time-consuming, and such applications often are non-reusable.

Another approach to working with source data which is in a source data format that is not one of a plurality of target data formats is described in U.S. Pat. No. 5,421,001 to Methe. Methe suggests an improved method of writing custom loader programs. According to Methe, there must be provided a common interface between all of the multiple foreign file formats (i.e., the source data format and the plurality of target data formats). This common interface is to be achieved by translating the elements of the source data format and the plurality of target data formats (which must be known a priori) into what amounts to a third, common format. The Methe approach allows an application programmer to use this common interface and common format for reading and writing in the multiple foreign file formats. In other words, the Methe approach applied to the problem of creating a suitable loader program is to write the software so as to translate the source data format and the plurality of target data formats into a predetermined common format upon opening the dump file, to write statements that manipulate the fields of the records in this common format, and then write statements that translate the data from this common format into the desired target data format(s) for writing into the target digital library.

The Methe approach allows an application programmer to reduce development time by being less concerned about differing file formats. The application programmer can be less concerned about differing file formats because he can write the data manipulation statements with the predetermined common format in mind. Although the use of a predetermined common format thus may be advantageous over the approach of writing a custom loader application from scratch, the approach is not without its shortfalls.

One problem with the Methe approach is that the application developer must decide what component or components of the source data in the source data format are to be read as he writes the loader program. Likewise, the application programmer must also decide the locations or locations of the target digital library (and, correspondingly, the desired target data format or formats) to which the source data, after conversion to the common format, is to be written. These data correspondence decisions thus are statically bound upon the compilation of the program. Thus, adopting the Methe approach makes it impossible to alter this decision without rewriting the loader program.

The custom loader application approach and the Methe approach both suffer from the drawback that the data correspondence decisions are coded into the loader applications.

SUMMARY OF THE INVENTION

It is an object of this invention to overcome the deficiencies and shortcomings mentioned above. In particular, it is an important object of this invention to set forth a method, a program product, and a computer system for dynamically control the mapping of selected data elements of source data in a source data format to particular data elements in a desired target data format selected from a plurality of target data formats.

In brief, this invention combines three elements to load data from files of varying data formats. More particularly, one of the three elements is an index class which specifies the data that the target digital library application expects. A second of the three elements is a data file parser to parse the dump file. The third of the three elements is a mapper to specify the mapping of the fields from the dump file into the index class (i.e., from the source data in the source data format into the desired target data format of the plurality of target data formats). The mapper is an important aspect of the invention, and allows users visually and dynamically to map which field from the dump file is to be placed in which field of the index class.

BRIEF DESCRIPTION OF THE DRAWINGS

FIG. 4 illustrates an example of a desired target data format.

FIG. 5 depicts a data table having records with attributes as specified by the desired target data format of FIG. 4.

FIG. 10 shows an exemplary embodiment of the mapping section output map according to the invention at a later stage.

FIG. 11 depicts the data table of FIG. 5 after application of the invention to the source data of FIG. 6.

DETAILED DESCRIPTION OF THE PREFERRED EMBODIMENT

The presently preferred embodiment of the invention will be explained with reference to the above-identified figures. Prior to such an explanation, however, certain terms will be explained.

Although the description will focus on teaching the invention as a series of steps in a method, it will be appreciated that the invention may be embodied in a computer system that contains hardware and software enabling it to perform the described operations. Similarly, the invention may be embodied in a computer program product.

On a practical level, the software that enables the computer system to perform the above-identified approach and operations of the invention is supplied on any one of a variety of media. Furthermore, the actual implementation of the approach and operations of the invention may be actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the invention. Thus, the invention is also embodied in a program product that includes a computer readable medium bearing software which enables a computer to perform operations according to the invention.

The invention is intended to be construed not only with respect to the example described below, but with respect to any and all equivalents in accordance with the appended claims.

Figure 1:
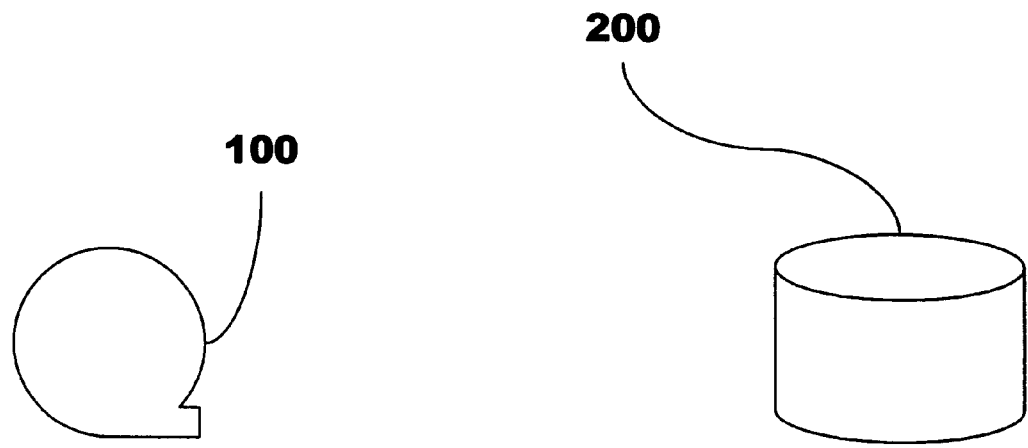
FIG. 1 shows a conceptual view of source data and a target digital library.

FIG. 1 shows source data 100 and a target digital library 200. The particular symbols are used for explanation only, and one knowledgeable in the art will appreciate that the source data 100 and the target digital library 200 may reside on any computer readable medium. Furthermore, the target digital library 200 is shown with a symbol representing data storage, but it will be understood that the target digital library 200 includes also a set of application programs and a database management system. Finally, it is useful to point out that, although the source data 100 and the target digital library 200 are shown as being held in one location, both may actually be distributed across different platforms and even locations. That is, although the target digital library 200 may include data held in geographically distant locations, the target digital library 200 may conceptually be understood as being a single entity.

Figure 2:
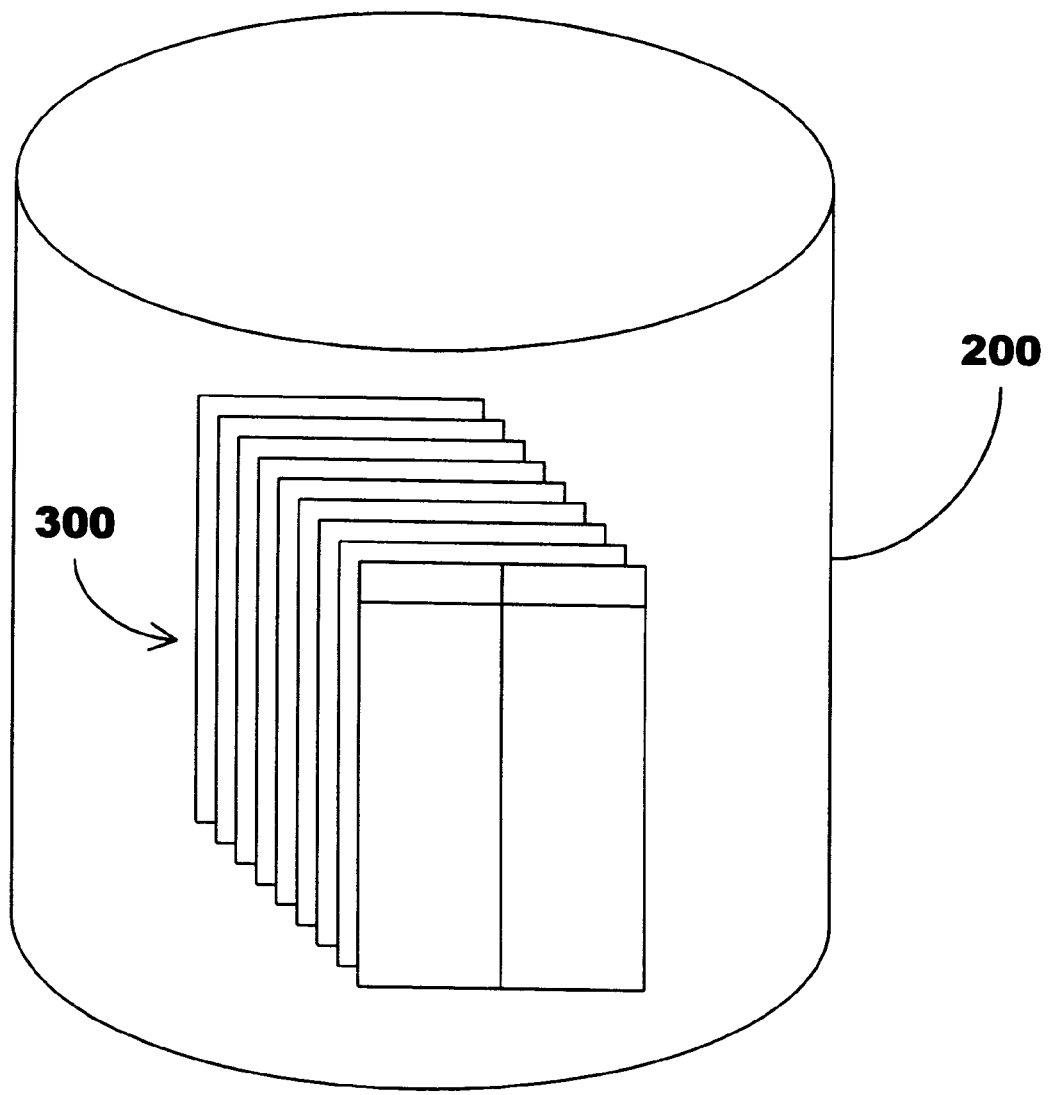
FIG. 2 illustrates a plurality of target data formats of a target digital library.

FIG. 2 shows target digital library 200. Included in target digital library 200 are a plurality of target data formats indicated generally at 300. Each of the plurality of target data formats may be different, although there is no requirement that they be different. In actual situations, the tables of a digital library typically have different formats.

Figure 3:
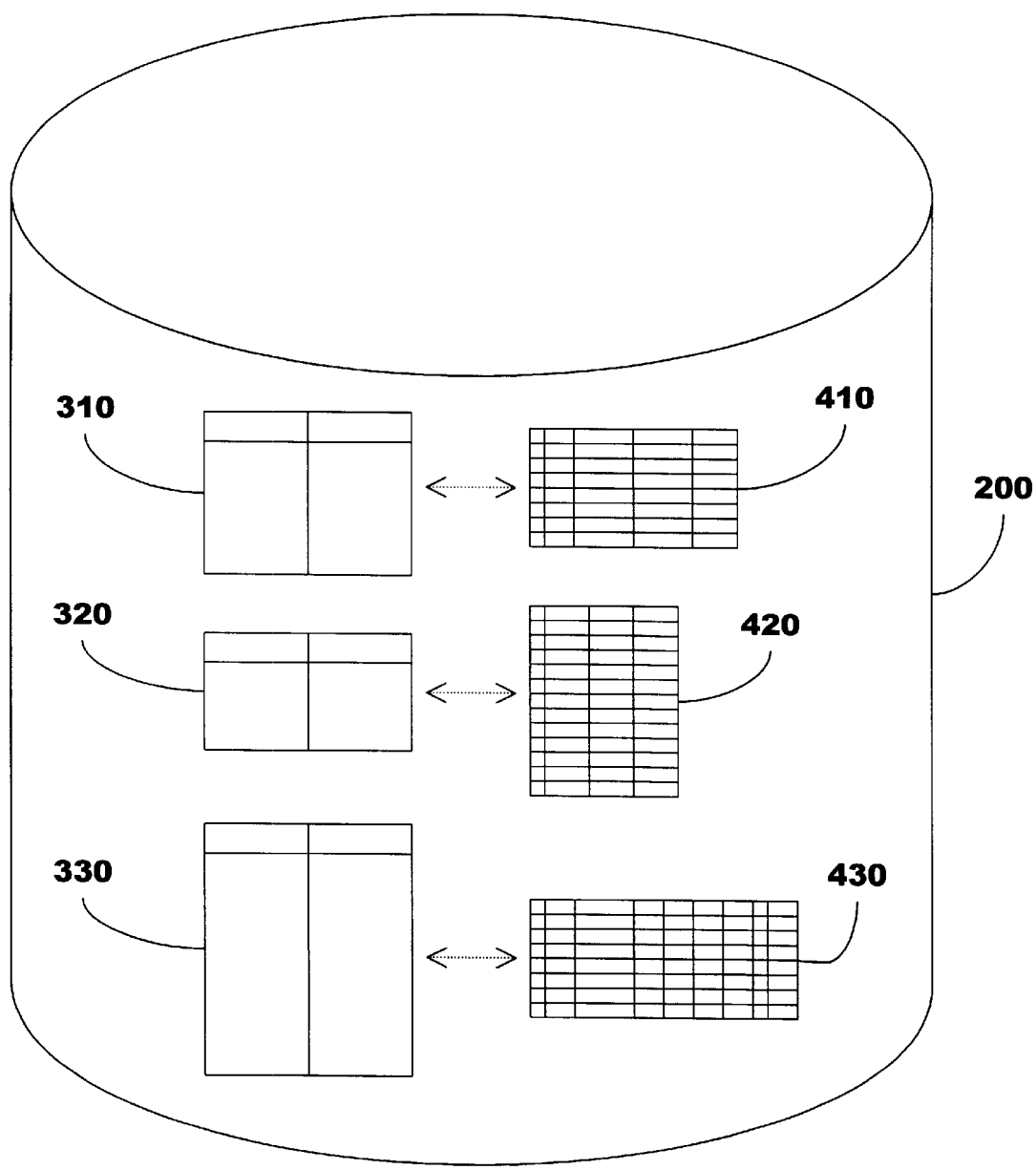
FIG. 3 shows how the plurality of target data formats relate to data tables in a target digital library.

FIG. 3 shows three of the plurality of target data formats 300 of target digital library 200. In particular, one target data format 310 describes the fields, or attributes, of the records of data table 410. Another target data format 320 describes the attributes of table 420 of the target digital library 200. Yet another target data format 330 describes the attributes of table 430. The correspondence between the illustrated target data formats and certain illustrated ones of the data tables of target digital library 200 is shown with broken lines with arrowheads at each end.

FIG. 4 shows, in more detail, information concerning exemplary target data format 330. In particular, target data format 330 describes a table which has nine attributes for each record. This target data format 330 may be named, e.g., Employee_Info. To put it another way, there is an index class named Employee_Info which describes a table with nine particular attributes for each record.

FIG. 5 shows an example of a table 430 which is based on the target data format or index class Employee_Info 330. More particularly, FIG. 5 shows two data records in table 430. The columns of the table, except for the first blank column, correspond to those named in target data format 330. Each record, in other words, relates to an employee and stores nine attributes of information about the employee. Each attribute has a particular datatype as shown in FIG. 4. For purposes of illustration, the values in some of the fields have been shortened. For example, the ID shown in table 430 is only 5 integer positions long even though the ID field defined for the Employee_Info index class 330 is 10 integer positions long. It will be appreciated that this has been done for illustration purposes only.

The table 430 may be named Retired_Employee_List, for example. As is apparent to one knowledgeable in this field, the Employee_Info index class 330 may be used for many different tables relating to employees.

Figure 6:
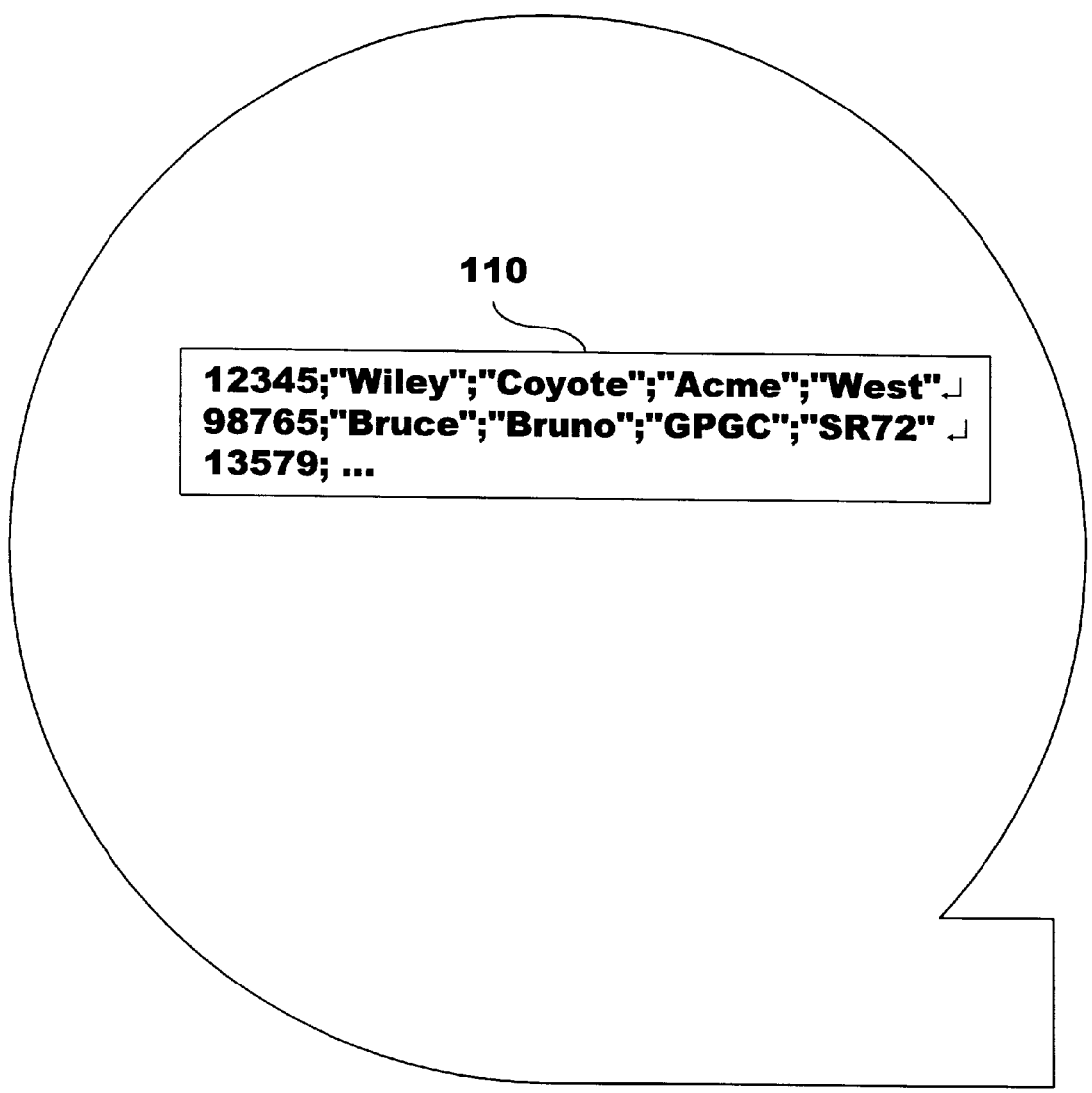
FIG. 6 shows source data in an exemplary source data format.

FIG. 6 shows source data 100 in more detail. In particular, source data 100 includes dump file 110. Dump file 110 has several records, two of which are shown in their entirety. The symbol ↵ indicates a new line indicator. In this instance, the dump file has five fields, each separated by a semicolon character, with one record per line. The first field is the employee serial number, the second field is the first name, the third is the last name, the fourth is the department, and the fifth is the location. For this example, it may be assumed that the source data relates to employees retired in the past. Presently, it is desired to add this information to the target digital library 200. Clearly, the source data format of five fields is different from the target data format of nine fields. In terms of the drawing figures, the source data format of the dump file 110 does not match the index class Employee_Info 330 used for the Retired_Employee_List 430.

Since the source data format is not the desired target data format, a data conversion must be performed. As already mentioned, one approach would be to write a custom loader application to perform this conversion. Another approach would be to write a loader application which converts the source data format of dump file 110 and also the target data format 330 of table 430 into a common form, and then to set the data correspondences using this common format, and then (after the necessary copying) to return the data into the target data format 330 of table 430.

Figure 7:
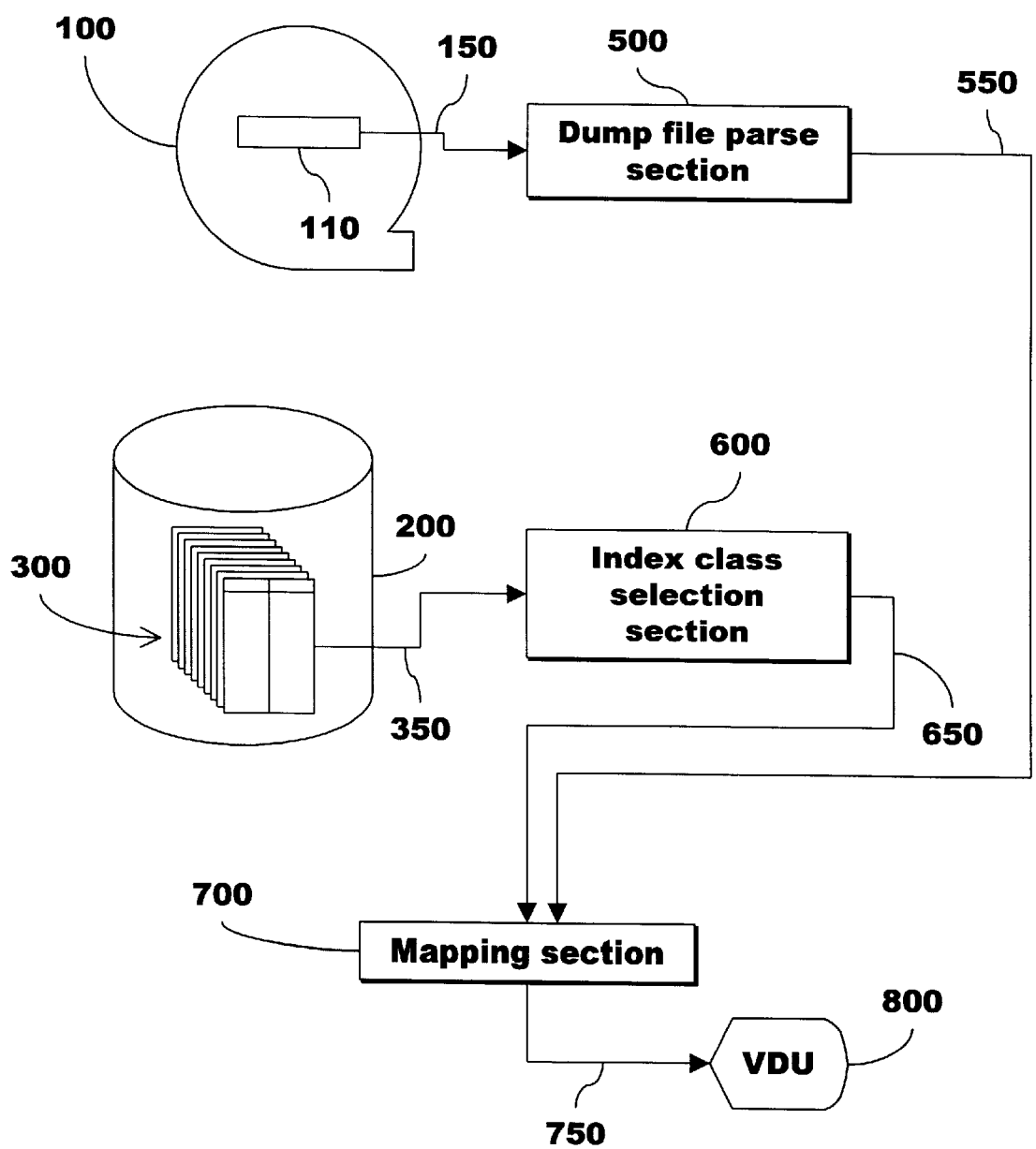
FIG. 7 shows, in schematic, an embodiment of the invention.
Figure 8:
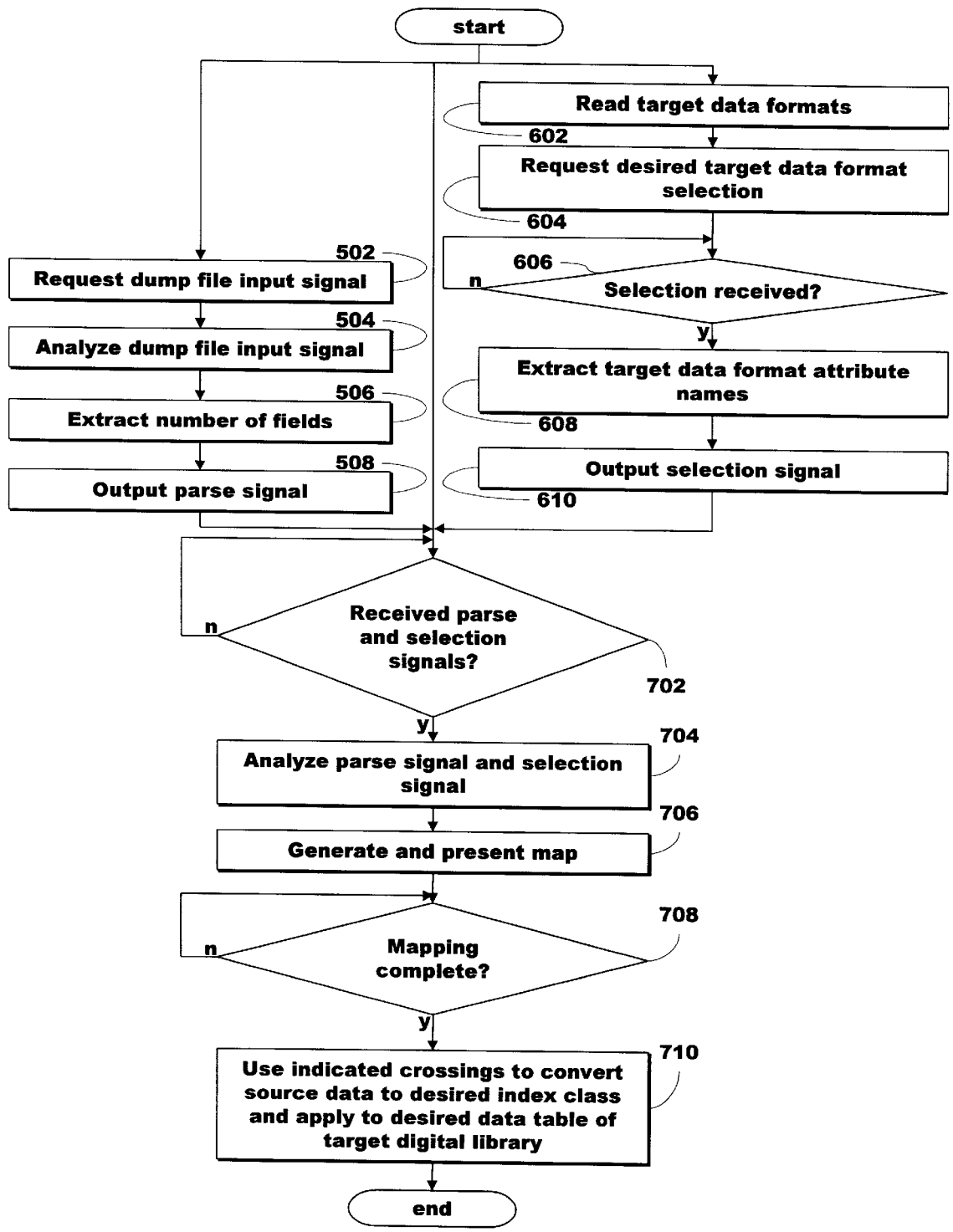
FIG. 8 shows a flowchart relating to an embodiment of the invention.

The approach of the invention may be understood with reference to FIGS. 7 and 8. FIG. 7 shows a schematic diagram, and FIG. 8 shows a flowchart according to the invention.

In FIG. 7 dump file 110 of source data 100 is provided as a dump file input signal 150 to dump file parse section 500. It will be understood that dump file input signal 150 may be represented by a stream of electronic impulses in a manner well known. Furthermore, dump file input signal 150 or any of the other items described as signals below may also be implemented as a file written in memory. The exact implementation is not critical to the invention. It will also be understood that dump file parse section 500 may be a process active on a computer system or, possibly, specialized hardware designed for a particular kind of source data 100.

Dump file parse section 500 analyzes dump file input signal 150 to determine certain information concerning dump file 110. In particular, dump file parse section 500 determines the number of fields for each record. This is accomplished through analyzing the patterns of certain commonly used separators such as semicolons, tab characters, new line indicators, spaces, commas, and the like. Dump file parse section 500 optionally confirms the correct parsing of dump file input signal 150 representing dump file 110 by interacting with the user. Further details concerning the operation of dump file parse section 500 are omitted in view of the well known status of such parsing operations in this field.

Dump file parse section 500 outputs a dump file parse signal 550 to mapping section 700. Dump file parse signal 550 includes information relating to the number of fields in the source data format of dump file 110. Optionally, dump file parse signal 550 further includes information relating to the number of rows or records, the general datatype of each field, and sample content for display. Further, dump file parse signal 550 optionally includes information internal to dump file 110 that indicates the names of the fields in the source data format. Such information may be referred to as header information. In this simplified example, dump file parse section 500 outputs only a number of fields as dump file parse signal 550. It will be understood that dump file parse signal 550 may be represented by a stream of electric impulses in a well known manner or as a file written in memory as already mentioned above with respect to the dump file input signal 150.

Index class selection section 600 uses, as input, the plurality of target data formats 300 of the target digital library 200. To put it more concretely, index class selection section 600 may receive from target digital library 200 an index class selection input 350 which contains, in electronic form, information relating to a desired target data format 330. More particularly, index class selection section 600 may be a process which allows a user to select a desired target data format 330 from the plurality of target data formats 300 and which extracts the target data format 330 from the target digital library 200. As an output, index class selection section 600 produces index class selection signal 650. Index class selection signal 650 is provided to mapping section 700 and includes, typically, at least the names of the attributes for each record of the selected index class (i.e., the fields of desired target data format 330). Optionally, index class selection signal 650 may also include datatype information and even sample data from data table 430.

It will be understood that the order of execution between dump file parse section 500 and index class selection section 600 is immaterial. Either one may precede the other, or both may be executed in parallel. Further, it will be appreciated that both sections may be processes or objects running on the same or different computing platforms.

Figure 9:
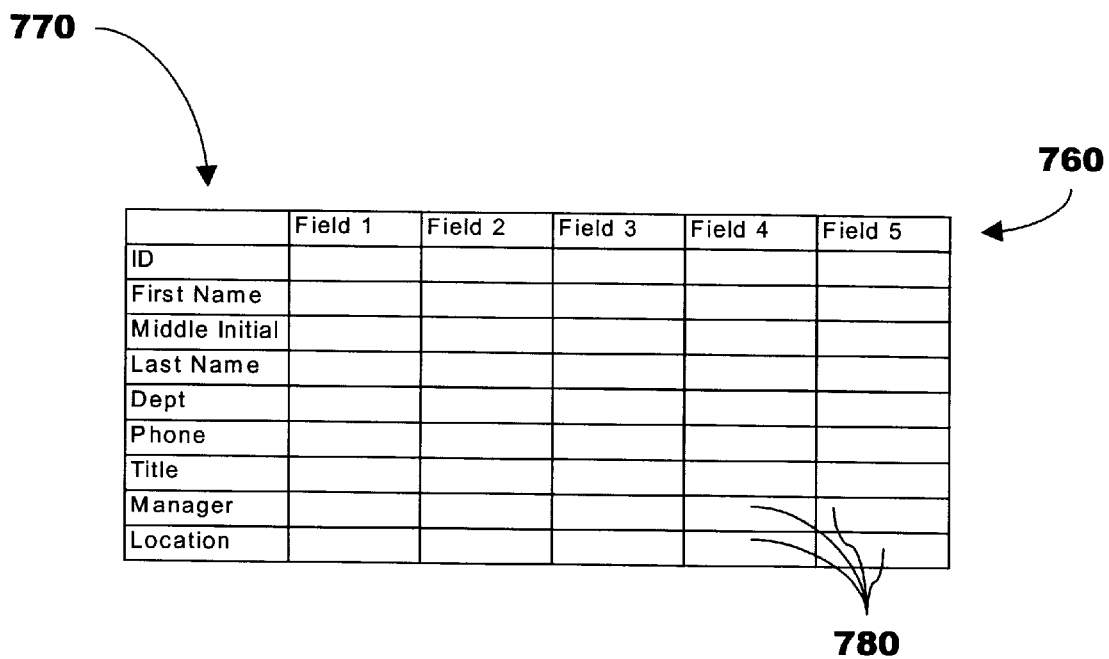
FIG. 9 shows an exemplary embodiment of the mapping section output map according to the invention.

After receiving the dump file parse signal 550 and the index class selection signal 650, mapping section 700 dynamically produces a mapping section output map 750 for display on visual display unit 800. An example of mapping section output map 750 is shown in FIG. 9. In particular, mapping section output map 750 represents a table or grid by which each of the plurality of fields identified in the dump file parse signal 550 is crossed with each of the attributes identified in the index class selection signal 650. The embodiment shown in FIG. 9 shows a grid, although the precise format is not essential. In other words, the rows and columns may be interchanged, and the headings may be put in any order.

Another way to describe the grid in a more generally is that it is a set of cells, each of which is arranged with respect to a first direction and a second direction, the first and second directions being orthogonal. Thus, the first direction may refer either to rows or columns. The second direction may thus refer to rows when the first direction refers to columns, or to columns when the first direction refers to rows. For simplicity, the rows and columns terminology will primarily be used in this description.

In detail, the grid of FIG. 9 shows, in the first row 760, a blank in the first column 770 followed by each of the fields identified in the dump file parse signal 550. It will be recalled that the dump file parse signal 550 included at least the number of fields. By this, it is meant that the dump file parse signal 550 may actually contain an integer, such as the integer 5. In this case, mapping section 700 would be adapted to create five field names as shown in FIG. 9 such as Field1, Field2, . . . Field5, for example. Another way in which the dump file parse signal 550 may indicate the number of fields is to enumerate them. In this alternative, the mapping section 700 would be adapted to use the names provided as the field names in the first row 760 of the grid, and would further be adapted to count the names provided in the dump file parse signal 550 to determine how many fields are included. Either way, the dump file parse signal 550 may be said to include the number of fields by its content.

In FIG. 9, the grid contains, in the first column 770, a blank in the first row 760 followed by each of the attributes identified in the index class selection signal 650. The rows and columns of the grid, except for the first row and the first column, define cells 780 of the grid. Each cell 780 represents the possible cross between one of the plurality of dump file fields in the first row 760 and a corresponding one of the plurality of index class attributes (it will be recalled that index class attributes may be referred to also as target data format fields) in the first column 770. For clarity, only a few of the cells 780 are indicated by lead lines in FIG. 9.

The grid provides, in each of its cells 780, a means (not shown) for the user of the program dynamically to indicate a pairing between a selected one of the dump file fields and a selected one of the index class attributes. Such a means may include, but is not limited to, a checkbox field or a text entry field. In the embodiment shown in FIG. 10, the user enters a letter X to indicate the desired crossing between a selected dump file field and a selected index class attribute. The mapping section output map 750 in the described embodiment thus comprises a grid having cells 780 which each include a field for indicating a desired crossing. To generalize, it may be said that mapping section output map 750 is a means for indicating crossings between the plurality of dump file fields and the plurality of desired target data format fields. To put it another way, the mapping section 700 may itself be understood as a means for determining crossings between the plurality of dump file fields and the plurality of desired target data format fields.

Likewise, using the particular terminology of the digital library, the mapping section output map 750 is a means for indicating crossings between the plurality of dump file fields and the attributes of the selected index class; the mapping section 700 itself provides a means for determining crossings between the plurality of dump file fields and the attributes of the selected index class.

It is an important aspect of this invention that the mapping section 700 dynamically operate to produce mapping section output map 750. Thus, after the crossings have been determined by the mapping section 700, this information is used to map the Field1 of the dump file to attribute ID of the Employee_Info index class 330, Field2 to attribute First Name of the Employee_Info index class 330, and so on. Given these mappings, it is straightforward to write the data from dump file 110 to data table 430 because data table 430 is based on the Employee_Info index class 330 and therefore has, as its fields, the attributes defined in that index class.

The result of appending the two rows completely shown in FIG. 6 to the table 430 shown in FIG. 5 is illustrated in FIG. 11. In particular, FIG. 11 shows the two rows appended with the data from dump file 110 correctly inserted in table 430. The values in the first column are not part of the data inserted, and are merely record numbers used for illustration. In record numbers 3 and 4, it will be noted that the record attribute Middle Initial is blank. This is because the source data did not include such data. One of skill in this field, after reading this description, will readily understand that such fields may be given an initial value of Null, an empty string, or some other value in keeping with the design of the target digital library. Furthermore, the above example showed a simple case in which the source data format had fewer fields than the desired target data format. The invention will operate properly and with equal effect even in situations in which the number of source data format data fields exceeds the number in the desired target data format. In such a situation, the data fields in the source data format which are not available in the desired target data format will have no crossings indicated.

It will further be appreciated that, regardless of the number of fields in the source data format and the desired target data format, there may sometimes be fields in the source data which are not needed in the desired target data format. In such cases, the proper course of action is to indicate no crossing with respect to the data fields of the source data format that are not needed.

To prevent logical confusion, the mapping section output map 750 may be set so that the indication of a first crossing between a source data field and a desired target data format field prohibits any second crossings from being indicated for the row and column that include the first crossing. This prohibition may remain in force unless the first crossing is negated, at which point the row and column that formerly included that first crossing may now be crossed as desired (subject to the limitation that no other rows/columns with crossings already indicated may be crossed a second time).

The invention will now be described with reference to FIG. 8, which shows a general flowchart useful in summarizing the above-identified operations.

The operation begins, in this example, with the dump file parse section 500 executing step 502 and the index class selection section 600 executing step 602 in parallel. At step 502, the dump file input signal 150 is requested from the computer system having source data 100 which includes dump file 110. After dump file parse section 500 receives dump file input signal 150, it analyzes the dump file in a well known manner in step 504. The results of this analysis are examined in step 506 to determine at least the number of fields occurring in each record. The dump file parse signal 550 is prepared and made available to the mapping section 700 in step 508.

In the meantime, index class selection section 600 queries the target digital library to obtain a list of the available plurality of target data formats 300. The list is presented to the user via VDT 800 in step 604 so that the user may indicate which one of the plurality of target data formats is the desired target data format. In other words, the user is solicited to select an index class. Step 606 determines whether the selection of an index class has occurred. If not, processing loops back to this step 606 (path n). If the selection of an index class has occurred, processing continues to step 608 (path y). In step 608, the index class selection section 600 queries the target digital library 200 to obtain information concerning the desired target data format (assumed to be target data format 330 in this example). In step 608, at least the target data format attribute names (i.e., the names of the fields) are extracted from digital library 200.

In step 610, the foregoing information concerning desired target data format 330 is included in index class selection signal 650 and made available to mapping section 700.

At the same time that the dump file parse section 500 and the index class selection section 600 began their processing, mapping section 700 began processing with step 702. In step 702, the mapping section 700 began to wait for the dump file parse signal 550 and the index class selection signal 650 to be made available. At this step, the process continually check for the availability of these two signals. Unless both signals are available, processing loops back to this step 702 (path n). When both signals are available, however, processing continues with step 704 (path y).

In step 704, the mapping section 700 analyzes the dump file parse signal 550 and the index class selection signal 650 to determine what to use for values in the first row 760 and the first column 770 of the grid in mapping section output map. 750. After step 704 is complete, the mapping section output map 750 is generated, including the cells 780 adapted to accept user indications of crossings between dump file fields and desired target data format fields. Also, at step 706, the mapping section output map 750 is presented to the user via VDT 800 so that the user may map the dump file fields to the desired target data format fields as appropriate for the particular dump file being converted and for the particular data table 430 of the target digital library 200.

After presentation of the mapping section output map 750 at step 706, processing continues to step 708. At step 708, it is determined whether the user has indicated that the mapping has been completed. If the mapping is not yet complete, processing loops back to this step 708 (path n). If the mapping is complete, however, processing continues to step 710 (path y).

At step 710, the crossings as indicated in cells 780 are used to convert the dump file 110 of source data 100 to the desired target data format 330 for adding to data table 430 of target digital library 200. The details of this step are omitted because, once the crossings have been determined, it is well within the skill of one familiar with this field to use the crossings to perform copying or moving of the data as desired.

It will be appreciated that the foregoing preferred embodiment represents only one way to practice the invention. Although parallel processing has been used as an example, serial processing also would provide the same end result albeit perhaps slower. The flowchart of FIG. 8 has been described with respect to processes, but it will be understood that objects may be instantiated with appropriate member functions to perform the processes. It will also be recognized that an overall control routine or object may be created so as to ensure the orderly performance of the different tasks.

A grid has been shown containing cells used to indicate crossings. Although the rows and columns of the grid may be interchanged, the general format of a grid showing crossings is a very important aspect of the invention because of its perfect clarity and because the user can visually and dynamically indicate crossings.

As a result of the invention, there may now be provided a computer system that executes a program according to the invention, the program providing for the visual indication of crossings in a dynamic manner. It is important to note that the program provides for such indication of crossings at execution time, without the need to modify the application program. Thus, the computer system may facilitate the inclusion of source data into a target digital library by the repeated use of the program according to the invention. Such repeated use decreases the burden on application programmers involved in large scale data integration.

There is claimed:

1. A method of visually mapping data of different record formats, comprising:

dumping source data in a source data format to provide a dump file of records each having a number of fields;

parsing said dump file to provide a parse signal indicating said number of fields;

determining, for a target data format, a set of target data format fields;

generating a grid comprising cells each arranged with respect to a first direction and a second direction, said second direction being orthogonal to said first direction, said grid including first field names arranged along said first direction and second field names arranged along said second direction, wherein:

said first field names are based on said number of fields indicated by said parse signal; and said second field names are based on said set of target data format fields;

indicating in said cells crossings between said first field names and said second field names; and mapping said fields of said records of said dump file to said target data format fields based on said crossings.

2. The method of visually mapping data of different record formats as set forth in claim 1, further comprising:

selecting said target data format from a plurality of target data formats; and reading, from a digital library, said plurality of target data formats.

3. The method of visually mapping data of different record formats as set forth in claim 1, further comprising said generating of said grid being performed as to appear on a visual display unit.

4. A computer system for visually mapping data of different record formats, comprising:

a processor, and a memory including software instructions adapted to enable the computer system to perform the steps of:

dumping source data in a source data format to provide a dump file of records each having a number of fields;

parsing said dump file to provide a parse signal indicating said number of fields;

determining, for a target data format, a set of target data format fields;

generating a grid comprising cells each arranged with respect to a first direction and a second direction, said second direction being orthogonal to said first direction, said grid including first field names arranged along said first direction and second field names arranged along said second direction, wherein:

said first field names are based on said number of fields indicated by said parse signal; and said second field names are based on said set of target data format fields;

allowing a user to indicate in said cells crossings between said first field names and said second field names; and mapping said fields of said records of said dump file to said target data format fields based on said crossings.

5. The computer system for visually mapping data of different record formats as set forth in claim 4, wherein said memory further comprises software instructions adapted to enable said computer system to perform the steps of:

allowing a user to select said target data format from a plurality of target data formats; and reading, from a digital library, said plurality of target data formats.

6. The computer system for visually mapping data of different record formats as set forth in claim 4, wherein said memory further comprises software instructions adapted to enable said computer system to perform said generating of said grid so as to appear on a visual display unit.

7. A computer program product for enabling a computer to provide visual mapping data of different record formats, comprising:

software instructions for enabling the computer to perform predetermined operations, and a computer readable medium bearing the software instructions;

the predetermined operations including the steps of:

dumping source data in a source data format to provide a dump file of records each having a number of fields;

parsing said dump file to provide a parse signal indicating said number of fields;

determining, for a target data format, a set of target data format fields;

generating a grid comprising cells each arranged with respect to a first direction and a second direction, said second direction being orthogonal to said first direction, said grid including first field names arranged along said first direction and second field names arranged along said second direction, wherein:

said first field names are based on said number of fields indicated by said parse signal; and said second field names are based on said set of target data format fields;

indicating in said cells crossings between said first field names and said second field names; and allowing a user to map said fields of said records of said dump file to said target data format fields based on said crossings.

8. The computer program product for enabling a computer to provide visual mapping data of different record formats, as set forth in claim 7, wherein said predetermined operations further comprise:

allowing a user to select said target data format from a plurality of target data formats; and reading, from a digital library, said plurality of target data formats.

9. The computer program product for enabling a computer to provide visual mapping data of different record formats, as set forth in claim 7, wherein said predetermined operations further comprise generating said grid so as to appear on a visual display unit.

* * * * *